Feb. 14, 1950   J. GUERCIO   2,497,765
FILM ADVANCER FOR STILL PROJECTORS
Filed March 27, 1946
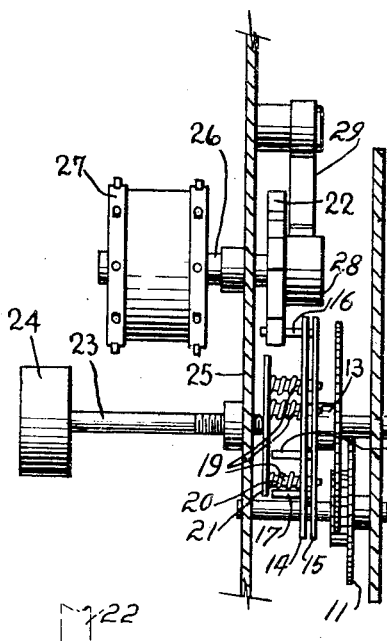
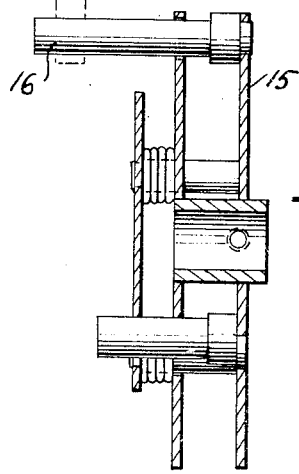
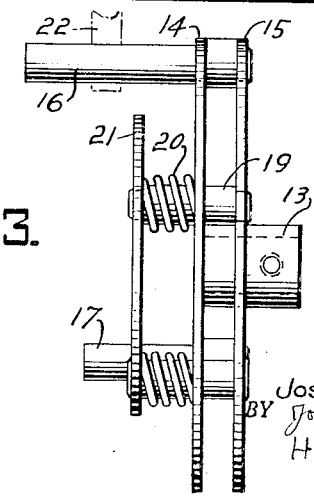
INVENTOR.
JOSEPH GUERCIO
BY Joshua R H Potts,
HIS ATTORNEY Patented Feb. 14, 1950

2,497,765

UNITED STATES PATENT OFFICE 2,497,765

FILM ADVANCER FOR STILL PROJECTORS

Joseph Guercio, Chicago, Ill., assignor to William Waltz, Chicago, Ill.

Application March 27, 1946, Serial No. 657,549

7 Claims. (Cl. 88—28)

This invention relates to improvements in projectors. More specifically, it relates to means for controlling the presentation of slide film.

For example, according to the principle of my invention, pictures may be provided continuously, or, they may be provided as desired.

Still more specifically, the projector of my invention may be placed in a window of a store, etc., and various films showing advertising may be flashed on the screen.

The pictures may be changed at regular intervals. For example, they may be changed every seven seconds, or long enough for the passer-by to effectively see the advertisement.

On the other hand, the projector of my invention may be used, for example, by a lecturer.

In this case, it may not be desired that the films be projected at regular intervals. Instead, the lecturer may lecture for two or three minutes on one film and ten seconds on another film, etc.; or, one film may be left "on" indefinitely.

According to the principle of my invention, I have provided means whereby, whenever the lecturer has finished lecturing on one slide, and desires to lecture on another slide, all that is necessary is to press a button, and the slide will be changed in substantially instantaneous manner.

According to the principle of my invention, I have provided three pins for operating the usual sprocket of a projector.

For lecturing, I have arranged the pins so that all three of them are actuated to turn the sprocket.

For continuous operation, the pins are easily adjustable, to provide for only one pin to actuate the sprocket wheel.

For lecturing, I have provided means for putting the three pins into operation, to actuate the sprocket.

In this way, when the lecturer snaps the switch for the next picture, it is not necessary to wait until the single relatively slowly-moving pin moves around to actuate the sprocket wheel, but instead, there will always be a pin in position to immediately actuate the sprocket wheel, to turn it to the next picture.

Further objects and advantages will appear and be brought out more fully in the following specification, reference being had to the accompanying drawings, in which:

Fig. 1 is a vertical section through the sprocket actuating means taken in the proximity of line 1—1 of Fig. 2.

Fig. 2 is an elevation of Fig. 1, as viewed from the right with parts broken away and the casing in section viewed from the right in Fig. 4.

Fig. 3 is a vertical section of Figure 4.

Fig. 4 is an elevation of Figure 1 looking in the direction of the arrow VI.

Referring to the drawings in detail, in which I have shown the preferred form for the purpose of illustrating the principle of my invention, I have shown a motor 10 and a gear train 11, also a drive shaft 12. Secured to the drive shaft, is a hub 13, mounted in a circular plate 14. A second circular plate 15 is slidably mounted on hub 13 and carries sprocket pins 16, 17 and 18.

Also provided on the plate 15, are guide pins 19.

Springs 20, which are spiraled around the guide pins 19, are adapted to bear against the plate 14 and against an adjusting plate 21, to force the parts into the position shown in Fig. 4.

It will be noted in Fig. 4 that the three pins 16, 17 and 18 align with sprocket drive 22 so that in rotating each of said pins will in turn engage and turn the sprocket wheel.

It will also be noted that one of the pins, to-wit: The pin 16, is longer than the others.

I have also provided an adjusting screw 23, having a head 24, which is adapted to screw into a housing 25, and is adapted to move inwardly against the plate 21, to push the same to the right, as viewed in Fig. 1.

When the plate 21 is pushed to the right, it will be moved to the position shown in Fig. 3.

In that position, the plate 15 will have been moved to the right, by the pins 19 as shown in Fig. 3, and, in that position, the pins 16, 17 and 18 on plate 15, will also have been moved to the right, as in Fig. 3, causing all the pins to become inoperative, except pin 16, leaving, therefore, only one pin to actuate the sprocket wheel 22.

This is the position that will be desired for continuous movement for the film sprocket 27, and, in such position, the pictures will be presented regularly and continuously. However, when it is desired to use the projector for lecturing, then the adjusting screw 23 will be moved to pull the screw away from the plate 21, causing the springs 20 to urge the plates 15 and 21 to the left, as shown in Fig. 4.

This will move plate 15 closer to plate 14, permitting the three pins 16, 17 and 18 to again become operative to engage sprocket 22.

By this arrangement, the lecturer, when he desires to change a picture, which is nearly always done at irregular times, need merely throw the switch (not shown) to start motor 10, and one of the three pins will always be in position to move the projector to flash the next picture.

The sprocket 22 has a shaft 26 on which is mounted a film sprocket 27, to actuate the movement of the film, as will be readily apparent to all those familiar with the art, without further description. The sprocket 22 also carries a hub or brake drum 28, and a spring 29 wrapped around posts 31 and 32 engages the drum 28 to prevent overrunning of the sprockets 22 and 27.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variation and modifications as come within the scope of the appended claims.

Having thus described my invention, what I claim as new and desire to secure by Letters Patent is:

1. In projector-operating means, a film driving sprocket, a second driving sprocket operatively connected thereto, and a driver for the second sprocket comprising a plate, having a plurality of pins mounted thereon; a second plate, also connected to said pins; a third plate slidably receiving said pins; and springs mounted on said pins, between the second plate and said third plate, and a plurality of driving pins extending from said first plate, one of said driving pins being longer than the others.

2. In projector-operating means, a film driving sprocket, a second driving sprocket operatively connected thereto; and a driver for the second sprocket comprising a plate having a plurality of pins mounted thereon, a second plate also connected to said pins; a third plate slidably receiving said pins; springs expansionally tensioned between the second plate and said third plate, and a plurality of driving pins extending from said first plate, one of said driving pins being longer than the others; and a means to shift said other pins out of registry with said second sprocket in opposition to said springs as desired.

3. In a film-projecting apparatus, a film driving sprocket, a second driving sprocket operatively connected thereto; a driver for the second sprocket comprising a rotary plate carrying a plurality of pins adapted to drive said second sprocket, another plate co-axial to said rotary plate, connector pins uniting said rotary plate and said other plate, a shaft, a plate having a hub mounted on said shaft and slidably disposed with respect to all of the above pins, spring means between said other plate and said mounted plate and a threaded rod contacting and serving to shift said other plate, in opposition to said springs.

4. In a film-projecting apparatus, a film driving sprocket, a second driving sprocket operatively connected thereto; a driver for the second sprocket comprising a rotary plate carrying a plurality of pins adapted to drive said second sprocket, another plate co-axial to said rotary plate, connector pins uniting said rotary plate and said other plate, a shaft, a plate having a hub mounted on said shaft, said rotary plate, said other plate, and all of said pins being slidable relative to said plate having said hub, spring means expansionally tensioned between said other plate and said mounted plate, and a means to shift said other plate in opposition to said springs.

5. In a film-projecting apparatus, a film-driving sprocket, a second driving sprocket operatively connected thereto; a driver for the second sprocket comprising a rotary plate having drive pins adapted to drive said second sprocket, and also having plate connecting pins, another plate spaced from said rotary plate and secured to said connecting pins, a shaft, a plate having a hub mounted on said shaft, said last mentioned plate being slidable relative to said rotary plate, said other plate, and all of said pins, springs tensioned expansionally between said other and mounted plates, and a means to shift said other plate with said rotary plate and drive pins, in opposition to said springs.

6. In a film-projecting apparatus, a film driving sprocket, a second driving sprocket operatively connected thereto; a driver for the second sprocket comprising a rotary plate having different length drive pins adapted to drive said second sprocket, and also having plate connecting pins, another plate spaced from said rotary plate and secured to said connecting pins, a shaft, a plate having a hub mounted on said shaft, said last mentioned plate being slidable relative to said rotary plate, said other plate, and all of said pins, springs tensioned expansionally between said other and mounted plates, and a means to shift said other plate together with said rotary plate and thus shift the shorter of said drive pins out of driving relation with said second sprocket, in opposition to said springs.

7. In a film-projecting apparatus, a film driving sprocket; a second driving sprocket operatively connected thereto; a driver for the second sprocket comprising a rotary plate having different length drive pins adapted to drive said second sprocket, and also having plate connecting pins, another plate spaced from said rotary plate and secured to said connecting pins, a shaft, a plate having a hub mounted on said shaft, said last mentioned plate being slidable relative to said rotary plate, said other plate, and all of said pins, and a means to shift said other plate together with said rotary plate and drive pins, and thus shift the shorter of said drive pins into or out of driving relation with said second sprocket as desired.

JOSEPH GUERCIO.

REFERENCES CITED

The following references are of record in the file of this patent:

UNITED STATES PATENTS

| Number | Name | Date |
|---|---|---|
| 1,166,120 | Fox | Dec. 28, 1915 |
| 1,624,669 | Lehwess | Apr. 12, 1927 |
| 1,906,931 | Lowkrantz | May 2, 1933 |
| 2,299,973 | Getten | Oct. 27, 1942 |